(12) United States Patent
Jung et al.

(10) Patent No.: US 8,898,422 B2
(45) Date of Patent: Nov. 25, 2014

(54) WORKLOAD-AWARE DISTRIBUTED DATA PROCESSING APPARATUS AND METHOD FOR PROCESSING LARGE DATA BASED ON HARDWARE ACCELERATION

(75) Inventors: Myung-June Jung, Suwon-si (KR); Ju-Pyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 124 days.

(21) Appl. No.: 13/595,088

(22) Filed: Aug. 27, 2012

(65) Prior Publication Data

US 2013/0227244 A1    Aug. 29, 2013

(30) Foreign Application Priority Data

Feb. 27, 2012   (KR) .................. 10-2012-0019709

(51) Int. Cl.
G06F 12/00       (2006.01)
G06F 13/00       (2006.01)
G06F 13/28       (2006.01)

(52) U.S. Cl.
USPC ................................... 711/173; 711/E12.069

(58) Field of Classification Search
USPC ........................................................ 711/173
See application file for complete search history.

(56) References Cited

U.S. PATENT DOCUMENTS

| 7,853,639 | B2 * | 12/2010 | Archer et al. ................. 709/201 |
| 8,225,259 | B1 * | 7/2012 | Mendel et al. ................ 716/116 |
| 8,321,873 | B2 * | 11/2012 | Shao ............................. 718/105 |
| 8,392,482 | B1 * | 3/2013 | McAlister et al. ............ 707/899 |
| 2011/0154350 | A1 | 6/2011 | Doyle et al. |

FOREIGN PATENT DOCUMENTS

| JP | 2010-097489 A | 4/2010 |
| KR | 10-0907533 | 7/2009 |
| KR | 10-1013073 | 1/2011 |

* cited by examiner

*Primary Examiner* — Yaima Rigol
*Assistant Examiner* — Hamdy S Ahmed
(74) *Attorney, Agent, or Firm* — Volentine & Whitt, PLLC

(57) ABSTRACT

A workload-aware distributed data processing apparatus and method for processing large data based on hardware acceleration are provided. The data processing apparatus includes a memory buffer including partitions. The data processing apparatus further includes a partition unit configured to distribute a mapping result to the partitions based on a partition proportion scheme. The data processing apparatus further includes a reduce node configured to receive content of a corresponding one of the partitions, and perform a reduction operation on the content to generate a reduce result.

18 Claims, 7 Drawing Sheets

WORKLOAD-AWARE DISTRIBUTED DATA PROCESSING APPARATUS AND METHOD FOR PROCESSING LARGE DATA BASED ON HARDWARE ACCELERATION

CROSS-REFERENCE TO RELATED APPLICATION(S)

This application claims the benefit under 35 U.S.C. §119 (a) of Korean Patent Application No. 10-2012-0019709, filed on Feb. 27, 2012, in the Korean Intellectual Property Office, the entire disclosure of which is incorporated herein by reference for all purposes.

BACKGROUND

1. Field

The following description relates to a workload-aware distributed data processing apparatus and method for processing large data based on hardware acceleration.

2. Description of the Related Art

With the increasing development of Internet technology, a larger amount of data has been created and distributed over the Internet. In such an environment where a large amount of data is available for use, a variety of companies, for example, portal companies, raise their competitiveness by accumulating a massive amount of data, and extracting and providing significant information to a user on request. Accordingly, various research has been conducted on establishing a large-scale cluster at a reduced cost to enable distributed data processing and distributed data parallel processing.

A distributed parallel processing programming model supports distributed parallel computation of a large amount of data stored in a cluster that is formed of a large number of nodes at a low cost. The distributed parallel processing programming model includes two steps: a "Map step" based on a map function made by a user and a "Reduce step" based on a reduce function. These two steps are performed in turn. However, as the amount of data to be processed increases, reduction of data analysis time to improve performance is more difficult.

SUMMARY

In one general aspect, there is provided a data processing apparatus including a memory buffer including partitions. The data processing apparatus further includes a partition unit configured to distribute a mapping result to the partitions based on a partition proportion scheme. The data processing apparatus further includes a reduce node configured to receive content of a corresponding one of the partitions, and perform a reduction operation on the content to generate a reduce result.

The data processing apparatus may further include a job controller configured to measure a processing performance of the reduce node, and establish the partition proportion scheme based on the processing performance.

The mapping result may include a key. The partition unit may include a main processor configured to generate an intermediate code with a fixed size based on the key. The partition unit may further include a proportion controller configured to determine the partitions based on the intermediate code and the partition proportion scheme, generate partition codes corresponding to the respective partitions.

The data processing apparatus may further include a data transfer controller configured to write the mapping result in the partitions based on the partition codes.

The data processing apparatus may further include a sorter configured to sort the content, and output the sorted content to the reduce node.

The data processing apparatus may further include a memory buffer management table configured to store memory buffer management information.

The memory buffer management information may include a start address of the memory buffer, or a number of partitions of the memory buffer, or a number of records remaining to be processed, or a memory section size, or information of a memory section header, or a partition lookup table, or any combination thereof.

The data processing apparatus may further include a mapping node configured to process input data in parallel to generate the mapping result.

The mapping result may include a key. The mapping node may be further configured to discard a bit other than a least significant bit of the key to update the key if a length of the key is greater than the least significant bit, and add a padding bit to the least significant bit to update the key if the length of the key is less than the least significant bit.

The data processing apparatus may be implemented through hardware acceleration on a field programmable gate array (FPGA).

In another general aspect, there is provided a data processing method including distributing a mapping result to partitions of a memory buffer based on a partition proportion scheme. The data processing method further includes determining content of a corresponding one of the partitions. The data processing method further includes performing a reduction operation on the content to generate a reduce result.

The data processing method may further include measuring a processing performance of a reduce node. The data processing method may further include establishing the partition proportion scheme based on the processing performance.

The data processing method may further include extracting a job environment. The data processing method may further include acquiring a list of reduce nodes from the job environment. The data processing method may further include determining the reduce node to be measured for the processing performance based on the list of the reduce nodes.

The measuring of the processing performance may include extracting first information about a number of records being processed by the reduce node. The measuring of the processing performance may further include extracting second information about the number of records being processed by the reduce node after a predetermined period of time. The measuring of the processing performance may further include determining the processing performance based on the first information, the second information, and the predetermined period of time.

The establishing of the partition proportion scheme may include determining a proportion for each of the partitions based on the processing performance.

The mapping result may include a key. The distributing of the mapping result may include generating an intermediate code with a fixed size based on the key. The distributing of the mapping result may further include determining the partitions based on the intermediate code and the partition proportion scheme. The distributing of the mapping result may further include generating partition codes corresponding to the respective partitions.

The distributing of the mapping result may further include writing the mapping result in the partitions based on the partition codes.

The determining of the content may include sorting the content.

The data processing method may further include processing input data in parallel to generate the mapping result.

The data processing method may be implemented through hardware acceleration on a field programmable gate array (FPGA).

Other features and aspects may be apparent from the following detailed description, the drawings, and the claims.

Figure 1:
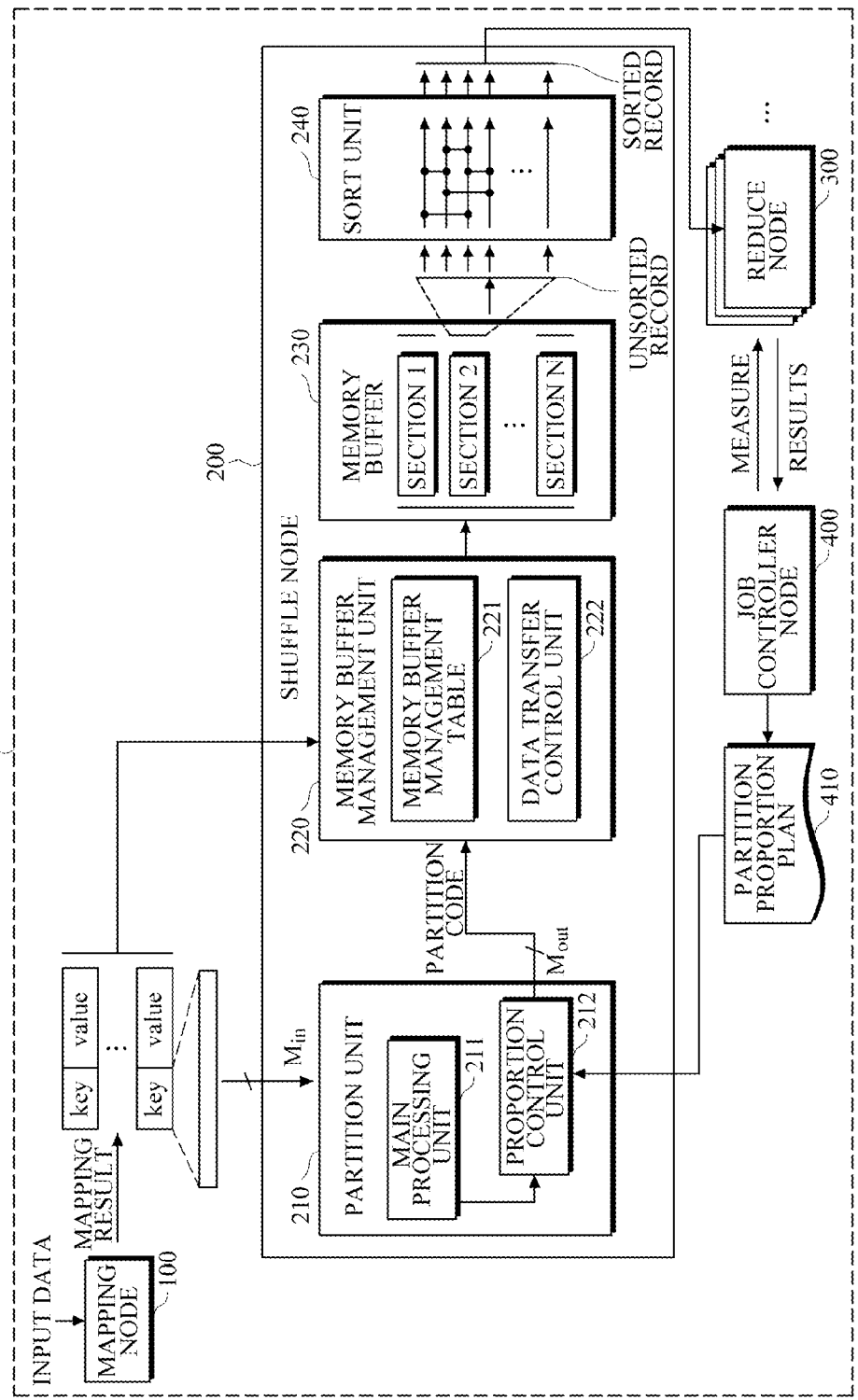
FIG. 1 is a diagram illustrating an example of a distributed data processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a distributed data processing apparatus 1. The distributed data processing apparatus 1 may be implemented through, for example, hardware acceleration on a field programmable gate array (FPGA). The distributed data processing apparatus 1 may be configured to include all worker nodes disposed within a FPGA chip, and may be configured to include some worker nodes disposed on a separate FPGA chip.

Referring to the example of FIG. 1, the distributed data processing apparatus 1 includes at least one mapping node 100, at least one shuffle node 200, and at least one reduce node 300. The distributed data processing apparatus 1 performs inter-node parallelization using these nodes, thereby allowing an effective distributed processing of large data.

The mapping node 100 receives input data, and processes the input data in parallel to generate and output at least one mapping result in the form of a key-value pair, to the shuffle node 200. The shuffle node 200 receives the mapping result output from the mapping node 100, and distributes the mapping result to the reduce node 300.

The reduce node 300 receives the mapping result distributed from the shuffle node 200, and performs a reduction operation on the mapping result to generate and output at least one final result (e.g., reduce result). For example, in the reduction operation, the reduce node 300 may remove duplicate data from the mapping result.

The distributed data processing apparatus 1 further includes a job controller node 400, e.g., a job controller. The job controller node 400 includes a job buffer configured to manage working environment information of each of the nodes 100, 200, and 300. In addition, the job controller node 400 monitors all jobs (e.g., the mapping results) to be processed, and measures and manages a status of resources (e.g., workloads, computing capabilities, and/or other resources known to one of ordinary skill in the art) of the reduce node 300. Further, the job controller node 400 establishes a partition proportion plan 410 (e.g., a partition proportion scheme) based on the shuffle node 200 distributing jobs to the reduce node 300. Operations of the measurement of the performance of the reduce node 300 and the establishment of the partition proportion plan 410 will be described later in detail with reference to FIG. 5.

The shuffle node 200 includes a partition unit 210, a memory buffer management unit 220, a memory buffer 230, and a sort unit 240, e.g., a sorter. The partition unit 210 receives the mapping result output from the mapping node 100, for example, at least one respective key of the mapping result structured in a key-value pair. The partition unit 210 allocates at least one corresponding partition (e.g., section) of the memory buffer 230 based on the key.

Figure 2:
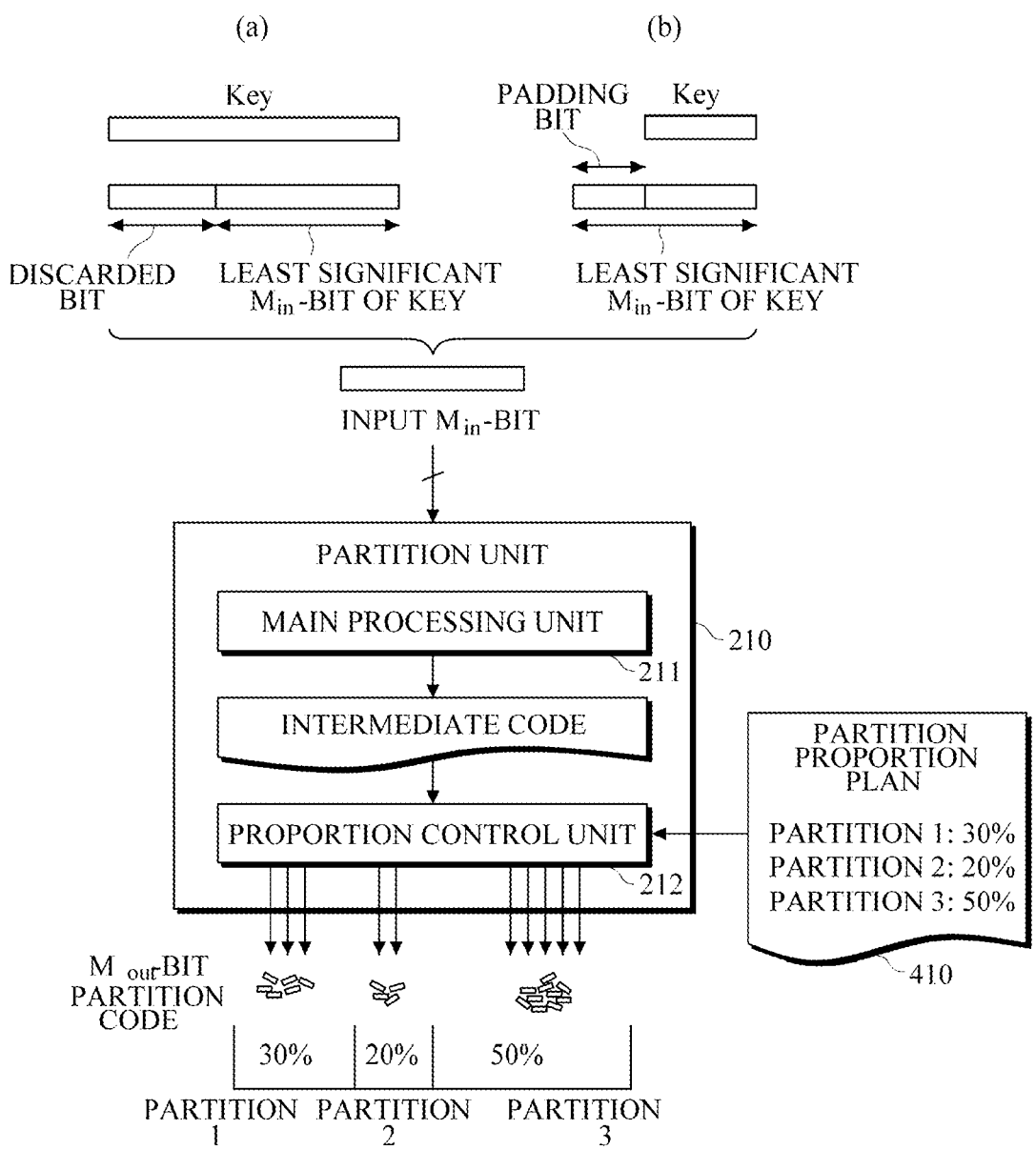
FIG. 2 is a diagram illustrating an example of a partition unit of a distributed data processing apparatus.

FIG. 2 illustrates an example of the partition unit 210 of the distributed data processing apparatus 1 of FIG. 1. In this example, the key of the mapping result is variable, and thus, for effective hardware-based processing, a least significant bit $M_{in}$-bit of the key is input into the partition unit 210.

In more detail, as shown in (a) of FIG. 2, if a length of the key of the mapping result is greater than the least significant bit $M_{in}$-bit of the key, a remaining bit(s) other than the least significant bit is discarded. On the contrary, as shown in (b) of FIG. 2, if a length of the key is less than the least significant bit $M_{in}$-bit, one or more arbitrary values (for example, zeros) are added to the least significant bit $M_{in}$-bit, as a padding bit(s), to pad the least significant bit $M_{in}$-bit, and the key with the completed least significant bit $M_{in}$-bit is input into the partition unit 210. For example, these operations may be performed by the mapping node 100 and/or the partition unit 210 of FIG. 1.

Referring to FIG. 2, the partition unit 210 includes a main processing unit 211 (e.g., a main processor) and a proportion control unit 212 (e.g., a proportion controller). The main processing unit 211 receives the least significant bit $M_{in}$-bit output from the mapping node 100, and performs an operation on the least significant bit $M_{in}$-bit to generate and output an intermediate code with a fixed size. For example, the main processing unit 211 may perform a cryptographic hash function on an input of an arbitrary length, or perform a hash function on an input of a fixed length, to generate and output a hash code of a fixed size. However, the cryptographic hash function and the hash function are only examples, and other functions of generating an output of a fixed length based on an input of any length may be used, as known to one of ordinary skill in the art.

The proportion control unit 212 receives the intermediate code output from the main processing unit 211 and the partition proportion plan 410 established by the job controller node 400. The proportion control unit 212 generates and outputs at least one partition code $M_{out}$-bit corresponding to the partition(s) to which the mapping result is distributed or allocated based on the intermediate code output and the partition proportion plan 410.

For example, the job controller node 400 of FIG. 1 may measure a resource status of each of three reduce nodes (e.g., the reduce node 300), and may establish the partition proportion plan 410 based on measurement results. In this example, according to the partition proportion plan 410 of FIG. 2, reduce node 3 (corresponding to partition 3) including the most resources is allocated 50% of a job, and reduce node 1 (corresponding to partition 1) and reduce node 2 (corresponding to partition 2) are allocated 30% and 20% of the job, respectively. The partitions to which the mapping result is distributed may be recognized from partition codes output from the proportion control unit 212, and accordingly, 30% of the mapping result is distributed to partition 1, 20% is distributed to partition 2, and 50% of the mapping result is distributed to partition 3.

Referring back to FIG. 1, the memory buffer management unit 220 includes a memory buffer management table 221 and a data transfer control unit 222, e.g., a data transfer controller. The memory buffer management table 221 stores information required by the partition unit 210 and the sort unit 240 to use the memory buffer 230. The data transfer control unit 222 receives the mapping result output from the mapping node 100 and the partition code output from the partition unit 210, and outputs (e.g., writes) the mapping result to the memory buffer 230 based on the partition code. The data transfer control unit 222 further outputs data (e.g., the mapping result) of the memory buffer 230 to the sort unit 240. The shuffle node 200 performs data transmission through the data transfer control unit 222 without a central processing unit's (CPU's) directive and iterative load/store-based I/O intensive operation.

Figure 3:
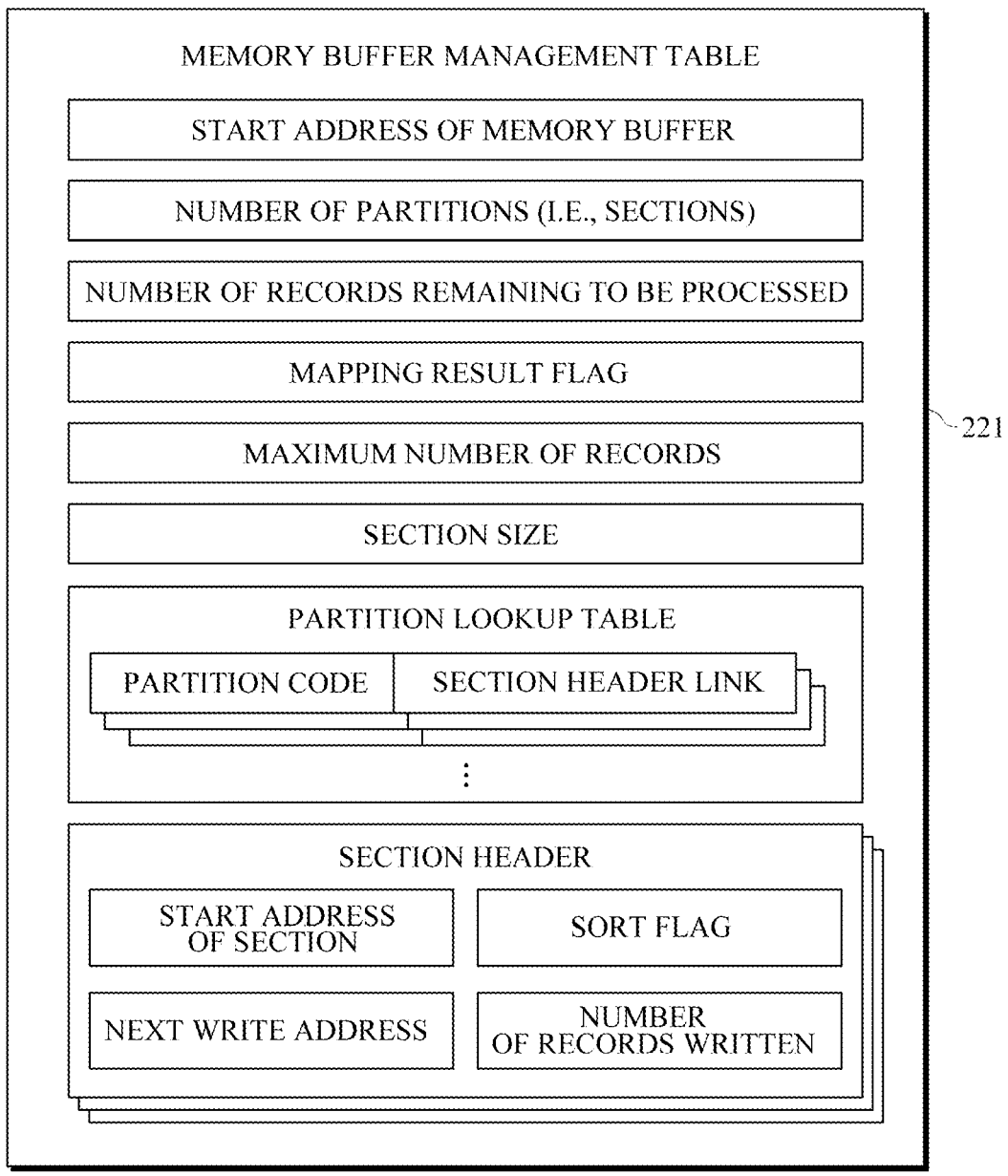
FIG. 3 is a diagram illustrating an example of a memory buffer management table of a distributed data processing apparatus.

FIG. 3 illustrates an example of the memory buffer management table 221 of the distributed data processing apparatus 1 of FIG. 1. The memory buffer management table 221 stores a variety of memory buffer management information required for use of the memory buffer 230. In this example, the memory buffer management information includes a start address of the memory buffer 230, a total number of partitions (i.e., sections) of the memory buffer 230, a number of records remaining to be processed, a mapping result flag, a maximum number of records, a section size, a partition lookup table, and section header information. However, this information are only examples, and other information known to one of ordinary skill in the art may be used.

In examples, the number of remaining records to be processed is information about a number of records waiting to be processed by the shuffle node 200 among all records of the mapping result. The mapping result flag is information indicating that there is no remaining mapping result to be processed by the shuffle node 200. The maximum number of records is a maximum number of records that can be written in each section of the memory buffer 230. The section size is information of a size of each section of the memory buffer 230 in bytes.

In further examples, the partition lookup table includes at least one partition code and at least one respective section header link, i.e., a list of pairs of a partition code and a section header link. Based on the partition lookup table, a header of a corresponding section of the memory buffer 230 can be directly-accessed via the section header link. The section header manages information of the memory buffer section. The information of the memory buffer section includes a start address of the section that is used as a base address of the section, a sort flag indicating whether the section is sorted, a next write address offset by predetermined bytes from the start address, and information about a number of records written in the section so far.

Referring again to FIG. 1, the memory buffer 230 includes one or more partitions (e.g., sections), each corresponding to the respective reduce node 300. Each partition may include a different distribution proportion in proportion to a processing performance of the corresponding reduce node 300. The reduce node 300 reads content (e.g., the mapping result) of a corresponding partition, removes a duplicate key, and generates and outputs a final result based on the content. Thus, despite different processing performances of reduce nodes (e.g., the reduce node 300), because the reduce nodes process jobs at different distribution proportions, a processing delay due to the occurrence of a bottleneck event in the reduce nodes can be prevented.

The sort unit 240 sorts unsorted content (e.g., record) of each partition of the memory buffer 230, and outputs the sorted content to the reduce node 300. The sort unit 240 may check the sort flag of the memory buffer management table 221, sort unsorted content of a corresponding partition if the sort flag is set, and output the sorted content to the reduce node 300.

Figure 4:
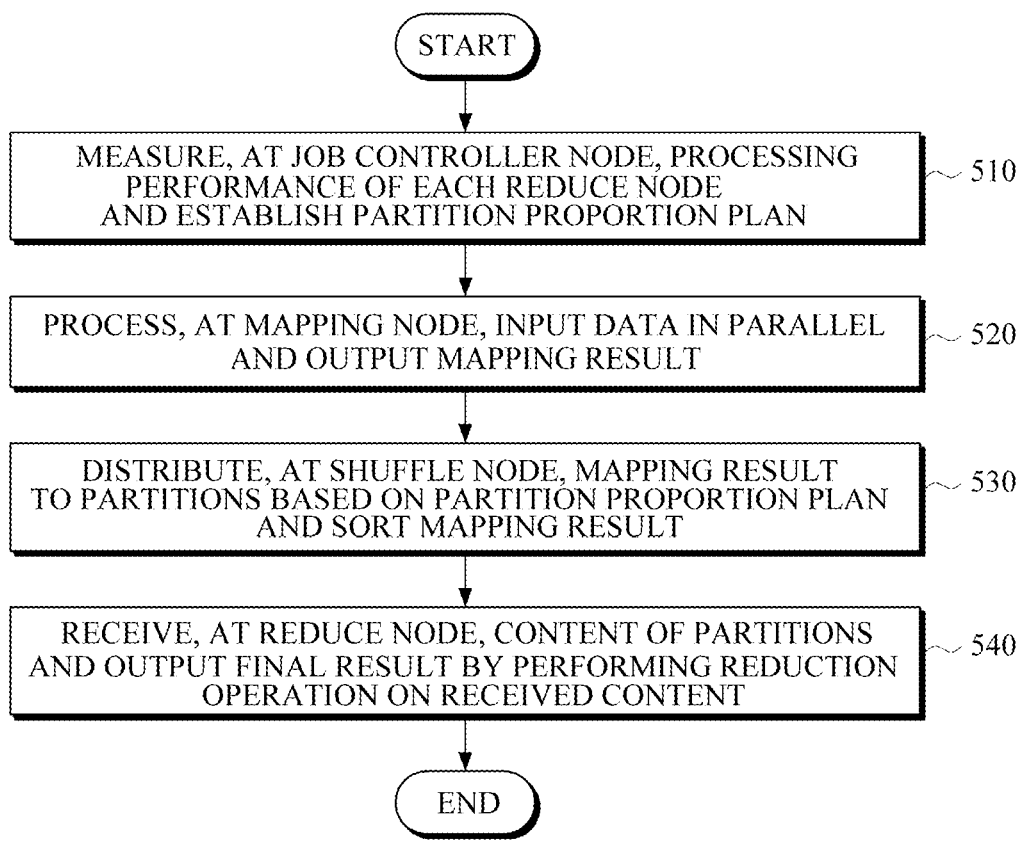
FIG. 4 is a flowchart illustrating an example of a distributed data processing method.

FIG. 4 illustrates an example of a distributed data processing method. The distributed data processing method will be described with reference to FIG. 4 in conjunction with FIG. 1. The distributed data processing method may be implemented through hardware acceleration, and the hardware acceleration may be implemented by, for example, implementing all functions of each node on a field programmable gate array (FPGA) chip.

In operation 510, the job controller node 400 measures a resource status (e.g., a processing performance) of each reduce node 300, and establishes a partition proportion plan based on measurement results. In operation 520, the mapping node 100 processes input data in parallel to generate at least one mapping result, and outputs the mapping result. The mapping result is in the form of a key-value pair, and as shown in FIG. 2, a least significant bit ($M_{in}$-bit) of a key of the mapping result is input into the partition unit 210 of the shuffle node 200.

In operation 530, the partition unit 210 distributes the mapping result output from the mapping node 100 to the partitions of the memory buffer 230 based on the partition proportion plan 410, and the sort unit 240 sorts content (e.g., the mapping result) of the partitions written in the memory buffer 230, and outputs the sorted content. In operation 540, the reduce node 300 receives the content output from the sort unit 240, and generates and outputs at least one final result by performing a reduction operation on the received content, such as removal of a duplicate key from the received content.

Figure 5:
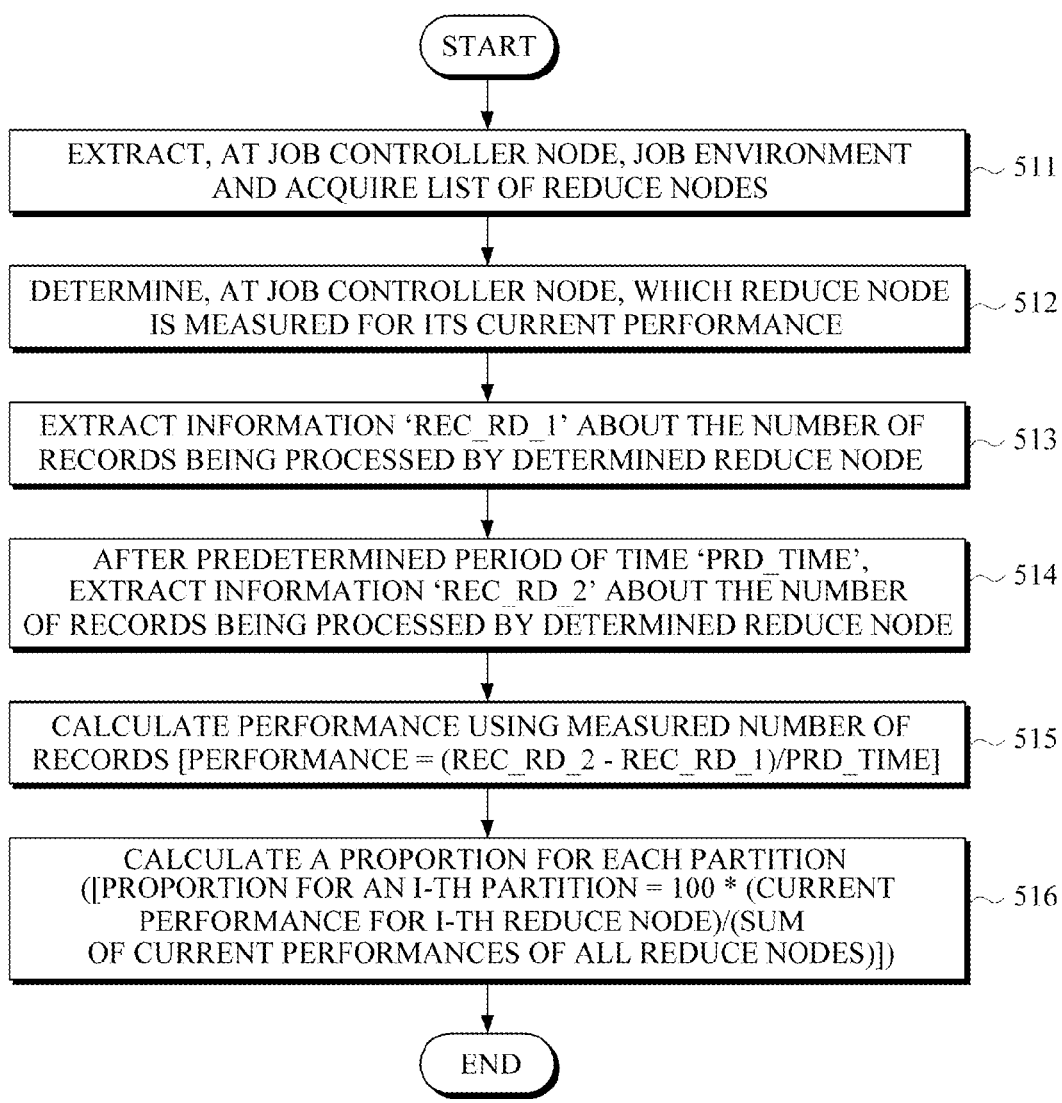
FIG. 5 is a flowchart illustrating an example of establishing a partition proportion plan.

FIG. 5 illustrates an example of establishing a partition proportion plan. Operation 510 of FIG. 4 in which the job controller node 400 establishes the partition proportion plan will be described in detail with reference to FIG. 5.

In operation 511, the job controller node 400 extracts a job environment from a job buffer, and acquires a list of reduce nodes (e.g., the reduce node 300) based on the job environment. In operation 512, the job controller node 400 determines which reduce node is to be measured for its current performance.

In operation 513, the job controller node 400 extracts information 'rec_rd_1' about the number of records being processed by the determined reduce node, from, e.g., the determined reduce node. In operation 514, after a predetermined period of time 'prd_time' elapses, the job controller node 400 extracts information 'rec_rd_2' about the number of records being processed by the determined reduce node, from, e.g., the determined reduce node.

In operation 515, the job controller node 400 calculates a processing performance of the determined reduce node using the measured information 'rec_rd_1' and 'rec_rd_2' about the number of records being processed by the reduce node, in an equation, [performance=(rec_rd_2−rec_rd_1)/prd_time]. In operation 516, the job controller node 400 calculates a proportion for each partition of the memory buffer 230 based on the calculated processing performance of the reduce node 300. For example, the proportion for each partition may be calculated by an equation, [proportion for an i-th partition=100*(current performance for i-th reduce node)/(sum of current performances of all reduce nodes)].

Figure 6:
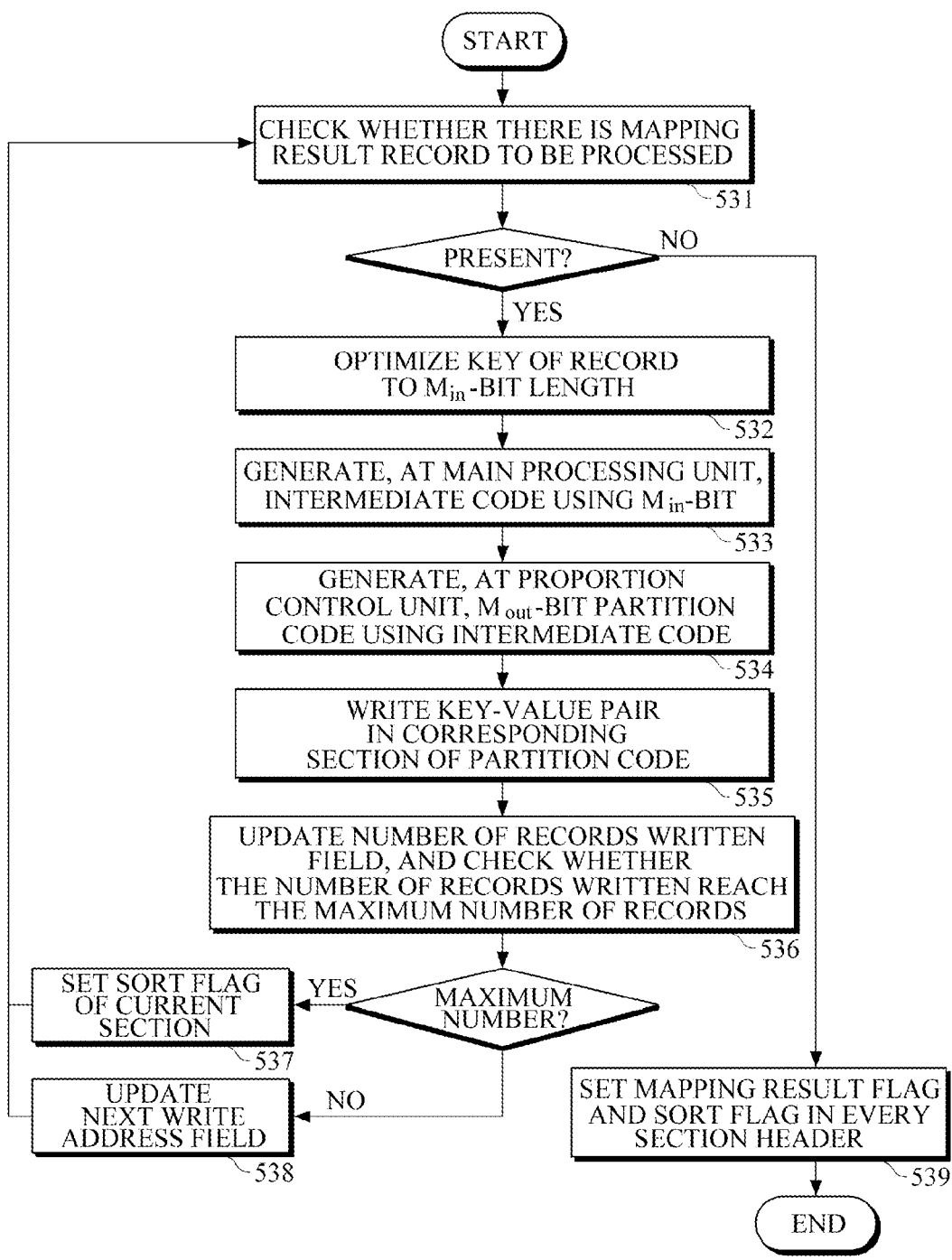
FIG. 6 is a flowchart illustrating an example of distributing at least one mapping result to partitions.

FIG. 6 illustrates an example of distributing at least one mapping result to partitions. With reference to FIG. 6 in conjunction with FIG. 1, operation 530 shown in FIG. 5 in which the shuffle node 200 distributes the mapping result to the partitions will be described in detail.

In operation 531, the partition unit 210 of the shuffle node 200 checks whether there is a mapping result record to be processed, i.e., present. For example, the partition unit 210 may check the memory buffer management table 221 to identify a number of records remaining to be processed, and if the number is 0, the partition unit 210 may determine that there is no record to be processed. If there is no record to be processed, in operation 539, the partition unit 210 and/or the memory buffer management unit 220 set a mapping result flag in the memory buffer management table 221 and a sort flag in every section header of the memory buffer management table 221. Further, the sort unit 240 checks the sort flag of a section being processed, and if the sort flag is set, the sort unit 240 sorts content (e.g., the mapping result) of the section in the memory buffer 230, as described later in FIG. 7.

If there is a mapping result record to be processed, in operation 532, the mapping node 100 and/or the partition unit 210 optimizes a key of the remaining record to a length of a least significant bit ($M_{in}$-bit). In operation 533, the main processing unit 211 of the partition unit 210 generates an intermediate code with a fixed size using the the least significant bit $M_{in}$-bit.

In operation 534, the proportion control unit 212 of the partition unit 210 determines partitions of the memory buffer 230 to which the mapping result is distributed using the intermediate code and the partition proportion plan 410, and generates at least one partition code $M_{out}$-bit corresponding to each respective partition or section. In operation 535, the data transfer control unit 222 of the memory buffer management unit 220 writes the mapping result (structured in a key-value pair) in a corresponding section of the partition code.

In operation 536, the memory buffer management unit 220 updates a number of records written in a section header of the current section in the memory buffer management table 221, and checks whether the number of records written reaches the maximum number of records in the memory buffer management table 221. If the number of records written reaches the maximum number of records, in operation 537, the memory buffer management unit 220 sets a sort flag in the section header of the current section. Otherwise, in operation 538, the memory buffer management unit 220 updates a next write address field in the section header. The shuffle node 200 iteratively performs the above operations (after operation 531) until there is no remaining record to be processed, and thereafter, the sort unit 240 proceeds with the sorting operation.

Figure 7:
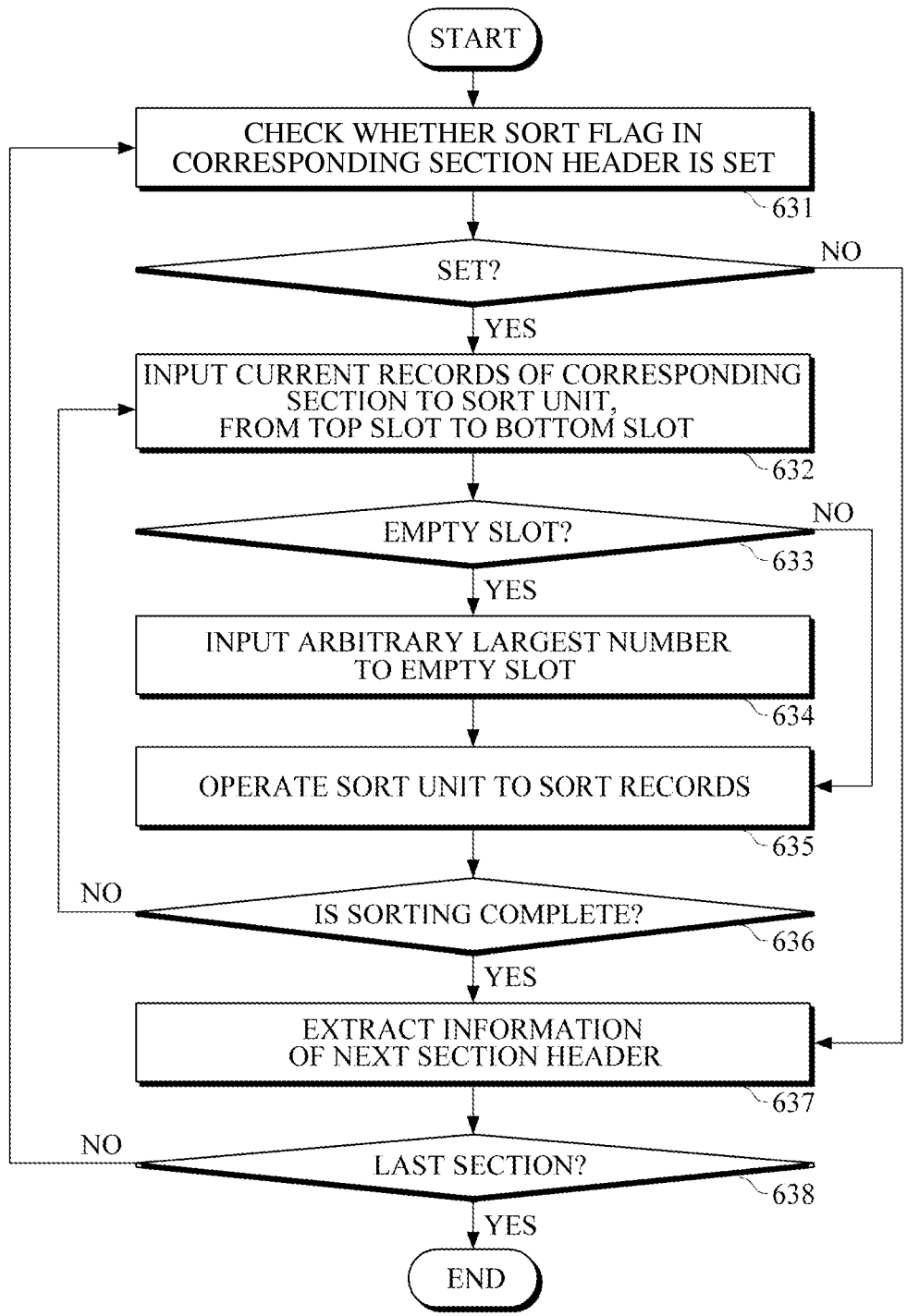
FIG. 7 is a flowchart illustrating an example of sorting at least one mapping result.

FIG. 7 illustrates an example of sorting at least one mapping result. With reference to FIG. 7 in conjunction with FIG. 1, operation 530 shown in FIG. 5 in which the shuffle node 200 sorts the mapping result will be described in detail.

In operation 631, the sort unit 240 checks whether a sort flag in a corresponding section header of the memory buffer management table 221 is set in 631. If the sort flag is not set, in operation 637, the sort unit 240 extracts information of a next section header from the the memory buffer management table 221.

If the sort flag is set, in operation 632, current records, including the mapping result, of a corresponding section is input to the sort unit 240, from a top slot to a bottom slot of the current section in the memory buffer 230. In operation 633, the sort unit 240 determines whether a number of the current records is less than a maximum number of records, that is, whether there is an empty slot in the sort unit 240. If there is an empty slot, in operation 634, the sort unit 240 inputs an arbitrary number, for example, the largest number, to the empty slot. This is to increase a hardware processing efficiency of the sort unit 240 and to locate the largest number at the very last position of the sorting result, thereby allowing the number to be easily deleted.

In operation 635, the sort unit 240 is operated to sort the current records. In operation 636, the sort unit 240 determines whether all records in the current section are completely-sorted. If the sorting is not complete, operations after 632 are iteratively-performed to sort the remaining records. If the sorting of the records is complete, in operation 637, the sort unit 240 extracts information of the next section header from the memory buffer management table 221.

In operation 638, the sort unit 240 determines whether the current section is the last section. If the current section is not the last section, operations after 631 are iteratively-performed. Otherwise, the sort unit 240 ends the sorting operation.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing apparatus comprising:
   a memory buffer comprising partitions;
   a partition unit configured to distribute a mapping result to the partitions based on a partition proportion scheme; and
   a reduce node configured to receive content of a corresponding one of the partitions, and
   perform a reduction operation on the content to generate a reduce result,
   wherein:
   the mapping result comprises a key; and
   the partition unit comprises a main processor configured to generate an intermediate code with a fixed size based on the key, and
   a proportion controller configured to determine the partitions based on the intermediate code and the partition proportion scheme, generate partition codes corresponding to the respective partitions.

2. The data processing apparatus of claim 1, further comprising:
   a job controller configured to measure a processing performance of the reduce node, and
   establish the partition proportion scheme based on the processing performance.

3. The data processing apparatus of claim 1, further comprising:
   a data transfer controller configured to write the mapping result in the partitions based on the partition codes.

4. The data processing apparatus of claim 1, further comprising:
   a sorter configured to sort the content, and output the sorted content to the reduce node.

5. The data processing apparatus of claim 1, further comprising:
   a memory buffer management table configured to store memory buffer management information.

6. The data processing apparatus of claim 5, wherein the memory buffer management information comprises a start address of the memory buffer, or a number of partitions of the memory buffer, or a number of records remaining to be processed, or a memory section size, or information of a memory section header, or a partition lookup table, or any combination thereof.

7. The data processing apparatus of claim 1, further comprising: a mapping node configured to process input data in parallel to generate the mapping result.

8. A data processing apparatus comprising:
   a memory buffer comprising partitions;
   a partition unit configured to distribute a mapping result to the partitions based on a partition proportion scheme; and
   a reduce node configured to receive content of a corresponding one of the partitions, and perform a reduction operation on the content to generate a reduce result; and
   a mapping node configured to process input data in parallel to generate the mapping result,
   wherein:
   the mapping result comprises a key; and
   the mapping node is further configured to
   discard a bit other than a least significant bit of the key to update the key if a length of the key is greater than the least significant bit, and
   add a padding bit to the least significant bit to update the key if the length of the key is less than the least significant bit.

9. The data processing apparatus of claim 1, wherein the data processing apparatus is implemented through hardware acceleration on a field programmable gate array (FPGA).

10. A data processing method comprising:
    distributing a mapping result to partitions of a memory buffer based on a partition proportion scheme;
    determining content of a corresponding one of the partitions; and
    performing a reduction operation on the content to generate a reduce result,
    wherein:
    the mapping result comprises a key; and
    the distributing of the mapping result comprises generating an intermediate code with a fixed size based on the key, determining the partitions based on the intermediate code and the partition proportion scheme, and generating partition codes corresponding to the respective partitions.

11. The data processing method of claim 10, further comprising:
    measuring a processing performance of a reduce node; and
    establishing the partition proportion scheme based on the processing performance.

12. The data processing method of claim 11, further comprising:
    extracting a job environment;
    acquiring a list of reduce nodes from the job environment; and
    determining the reduce node to be measured for the processing performance based on the list of the reduce nodes.

13. The data processing method of claim 11, wherein the measuring of the processing performance comprises:
    extracting first information about a number of records being processed by the reduce node;
    extracting second information about the number of records being processed by the reduce node after a predetermined period of time; and
    determining the processing performance based on the first information, the second information, and the predetermined period of time.

14. The data processing method of claim 11, wherein the establishing of the partition proportion scheme comprises:
   determining a proportion for each of the partitions based on the processing performance.

15. The data processing method of claim 10, wherein the distributing of the mapping result further comprises:
   writing the mapping result in the partitions based on the partition codes.

16. The data processing method of claim 10, wherein the determining of the content comprises:
   sorting the content.

17. The data processing method of claim 10, further comprising:
   processing input data in parallel to generate the mapping result.

18. The data processing method of claim 10, wherein the data processing method is implemented through hardware acceleration on a field programmable gate array (FPGA).

\* \* \* \* \*